April 22, 1941.   M. P. DUKE   2,239,500
FOOD WARMER
Filed Dec. 13, 1939   2 Sheets-Sheet 1

Marsh P. Duke,
Inventor.
Haynes, Koenig and Wolf,
Attorneys.

April 22, 1941.  M. P. DUKE  2,239,500
FOOD WARMER
Filed Dec. 13, 1939  2 Sheets-Sheet 2
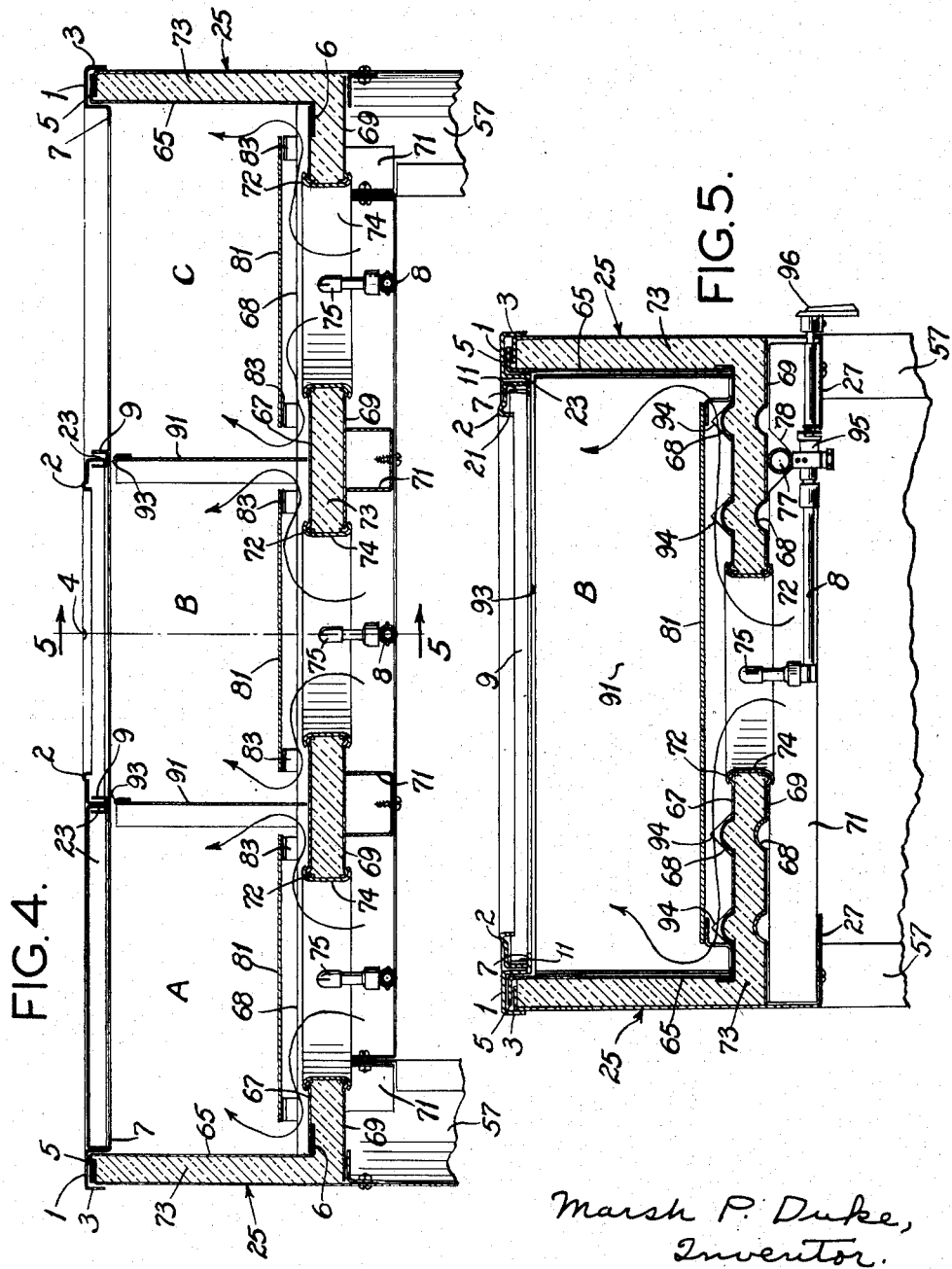

Patented Apr. 22, 1941

2,239,500

UNITED STATES PATENT OFFICE 2,239,500

FOOD WARMER

Marsh P. Duke, University City, Mo., assignor to Duke Manufacturing Company, St. Louis, Mo., a corporation of Missouri Application December 13, 1939, Serial No. 308,937

3 Claims. (Cl. 126—261)

This invention relates to food warmers, and with regard to certain more specific features, to food warming tables.

The invention is a continuation-in-part of the invention specified in my application Serial No. 254,393, filed February 3, 1939, eventuated as Patent No. 2,231,615, dated February 11, 1941, for Food warmer.

Among the several objects of the present invention may be noted the provision of a foodwarmer which is capable of warming a substantial variety of foods, each of which may require to be maintained at a substantially different temperature; the provision of a food warmer of the class described by means of which the heating of different foods thereon may be independently or simultaneously accelerated and which in general reduces the time and cost of heating; the provision of apparatus of the class described which in refrigerated restaurants and the like reduces the heat which must be absorbed by the refrigerating equipment; and the provision of apparatus of this class which operates dry without the production of unnecessary steam and which is simple in construction and operation. Other objects will be in part obvious and in part pointed out hereinafter.

The invention accordingly comprises the elements and combinations of elements, features of construction, and arrangements of parts which will be exemplified in the structures hereinafter described, and the scope of the application of which will be indicated in the following claims.

In the accompanying drawings, in which is illustrated one of various possible embodiments of the invention, Fig. 1 is a plan view of the apparatus;

Fig. 4 is a vertical section taken on line 4—4 of Fig. 1; and,

Fig. 5 is a vertical section taken on line 5—5 of Fig. 4.

Similar reference characters indicate corresponding parts throughout the several views of the drawings.

Since many of the details of the drawings refer to closely adjacent sheets of metal, such portions have been exaggerated in their relative spacings, in order to clarify the descriptions. Furthermore, certain beaded, rolled, and other joints are exaggerated, and it is to be understood that actually they are more compact than shown.

Figure 1:
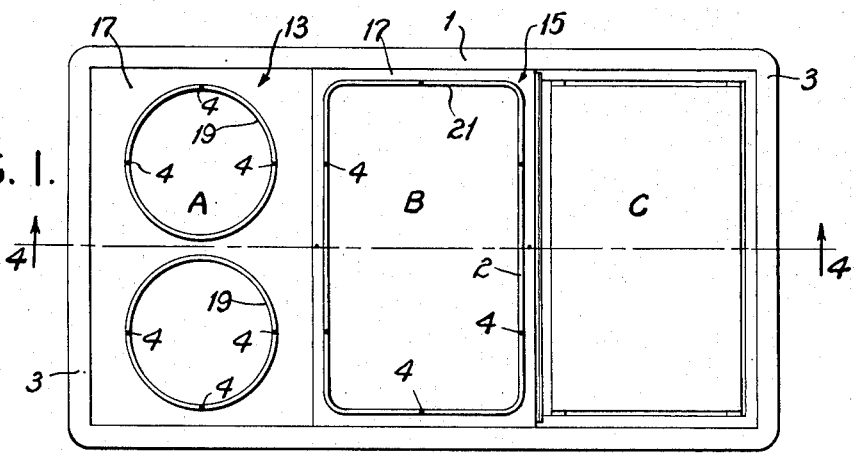

Referring now more particularly to Fig. 1, there is shown at numeral 1 a top frame. The peripheral portions 3 of this frame are formed as inverted U-shapes providing a guide to effect placement of the frame upon the upper edge of a box-like and hollow holding table. It is to be understood that equivalent downwardly concave shapes may be substituted for the U-shapes.

Inside of the inverted U-shaped channels 3, the flange 1 is provided with an inwardly directed horizontal flange 7 to which are attached spaced cross channels 9. The cross channels 9 are also U-shaped, but with the open portions of the U-shapes upwardly directed. The bottom, closed portions rest upon said flange 7. The ends of the members 9 are spaced from the peripheral U-shaped edge 3 as shown at 11 in Fig. 5.

The cross channels 9 and the peripheral frame 1 are so related as to provide a plurality of quadrilateral openings for covers, two of which are shown for example and indicated at 13 and 15 in Fig. 1. The third opening at the right in Fig. 1 is shown without a cover by way of example. These covers, in general, consist of a horizontal sheet 17 in which a suitable opening or openings are cut to receive a suitably formed flange of a dish or pan or the like. For example, the plate 13 is shown with two round openings 19 for receiving round dishes, and the plate 15 is shown with a single rectangular opening 21 for receiving a rectangular dish. Around the openings 19 and 21, as the case may be, are beads 2 in which are openings 4, the purpose of which will later be described.

The plates, or some of them, may be made flat and without any adapter openings but with circulating openings 4, to function merely as closed supports for dishes and the like. However, the various top plates are the same size and are interchangeable in the rectangular openings.

Each plate, such as 13 and 15, is provided about its periphery with a downwardly directed flange 23. These flanges at their longitudinal portions rest either in the U-shaped members 9, or upon the flange 7 of the frame 1, as the case may be. The end portions of the flanges 23 are positioned between the ends 11 of the U-shaped cross members 9 and the side of the frame 1 (see Fig. 5).

The described top construction results in the ability to remove easily the top plates for cleaning. When replaced they assume a substantially flush position with respect to the top of the U-shaped portion 3 and with respect to each other. It will be understood that the length of the table may be made to accommodate fewer or more of the rectangular tops, such as 13, 15.

The sides of the table are shown at numeral 25 (Figs. 4 and 5). These are turned in at their lower edges, as shown at 27, to support cross members 71. The members 71 in turn support a bottom 69. In connection with the bottom 69 is a spaced bottom wall 67 which is held up by means of flanges 6 of an inner wall structure 65. The inner structure 65 has a flange 5 about its top for resting upon the upper edge of the outer box 25. Thus there is formed the inner box 65 having an inner bottom 67, both being spaced from the outer box 25 having a lower bottom 69. The spaced bottoms 67 and 69 are provided with corrugations 68 for strength. The space between parts 25, 69 on the one hand, and 65, 67 on the other hand, is filled with heat insulating material 73.

Passing through the spaced bottoms 67, 69, and through the insulation therebetween, are open thimbles 74 held in place by beads 72. Associated centrally with the thimbles 74 are gas burners 75, the latter being fed by means of branches 8 from a gas manifold 77. The latter is supported in V-notches 78 in the supports 71.

Above the bottom 67 horizontal-radiator plates 81 are arranged upon supports 83 in order to absorb the heat from the burners 75 and radiate it upwardly and also to deflect convection currents of heat. The combustion burners are preferable to other heaters in the interest of economy. Products of combustion pass upwardly around the plates 81 and outwardly by leakage through the openings 19 and 21. The leakage is due to the relatively loose fit that these openings have with the food carriers. Convective circulation also takes place through the openings 4.

The space within the inner box 65 is divided by means of dividing plates 91 into as many compartments as there are burner units 75. These divider plates have their upper edges 93 arranged at a short distance from the respective U-shaped member 9 to permit a limited communication between compartments. At their lower edges the walls 91 are notched as at 94 to clear the upper corrugations 68.

The device is arranged with legs 57, which are longitudinally joined by means of a brace 63.

Each branch pipe 8 to each respective burner 75 is under control of the handle 96 of a valve 95 which may be turned to any one of low, high or off positions. In high position, the amount of gas burned at a burner is enough to raise the temperature of the respective food carried over the respective compartment A, B or C, and in low position, a pilot burning effect is had whereby the given temperature may be maintained. The valve used is such that the gas flow may be adjusted to a predetermined amount at either low or high setting.

From the above it will be seen that any one (or more) of the burners 75 may be operated at low or high position of the respective valve 95, and thus that each compartment A, B or C (determined by the dividing walls 91 and ends 65) may have its temperature independently controlled and this constitutes one of the advantages of the invention. For example, a long warming table in a cafeteria or the like may have many different foods to be kept at different temperatures.

With the old type of steam heated warming table, a single mass of water was used to heat all food containers. This had disadvantages, one of which was that all of the food was warmed to the same temperature, and secondly that it required more time to bring the relatively large mass of water up to the general temperature desired. Furthermore, the mass of water held a large amount of heat which, when radiated into rooms (sometimes refrigerated), unnecessarily overheated them or were required to be absorbed by the refrigeration system. Undesirable hot steam was also given off. With the present invention, any one or more of the burners 75 may be operated at a high burning rate until the food carried thereover is quickly heated to the proper temperature, after which the respective valve 95 may be set at the low burning rate which is such as to maintain the respective food temperature at the correct point. This involves a heating action only at the respective food in compartment A, B, or C, as the case may be, and therefore greater heating acceleration may be accomplished with a saving in both time and gas. At the same time, only a smaller amount of material needs to be kept up to temperature under pilot conditions if one or more other sections of the table are not being used.

An example of the different heating requirements for different foods is that of mashed potatoes as compared with soup. The former should be kept at not over 115° F. in order to prevent blackening; while soup may and should be kept at a temperature of about 150° F. Meats, vegetables and other articles have different optimum temperatures which are respectively accommodated by the invention.

Another advantage of the invention is that the radiating plates 81 serve to prevent direct conductive or convective impingement of the heat on the bottoms of the containers in the openings 19 and 21. That is, they modulate the heat by receiving it from the respective burners 75 and then transmitting it to the plate 81 by radiation and deflected convection. The convection lines are shown in the drawings. The result is an even, modulated temperature on the articles being heated, controllable as to the respective sections A, B and C.

Figure 2:
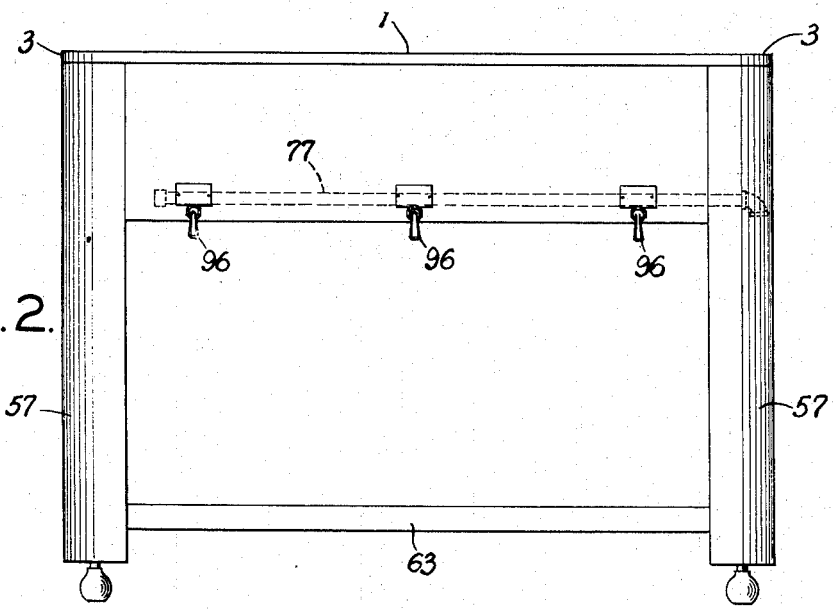
Fig. 2 is a front elevation.
Figure 3:
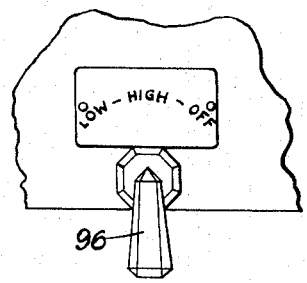
Fig. 3 is an enlarged detail elevation of a control.

It will be seen that, when the burners 75 are lighted, combustion occurs at least in part in the inlet opening and the products of combustion pass upwardly around the plates 81, into the respective compartments A, B or C, as the case may be. This feature of carrying on the combustion in the openings results in the advantages of easy lighting, a direct influx to the burner of air for combustion and (in conjunction with the plates 81) the prevention of direct or uneven application of heat to the bottoms of food containers. This is all accomplished without excessive depth of the apparatus. That is, the food containers are at the usual desired elevation while the bottom of the box 25 is quite high. Since the height of a food warmer is limited to the height of adjacent tables and the like, any reduction in depth of the heating chambers results in increase in desirable storage space beneath. The bottom storage attained by applicant's construction is shown in Fig. 2.

From the above it will be seen that the device forms a box which constitutes a dry heater for the food pans supported by it.

In view of the above, it will be seen that the several objects of the invention are achieved and other advantageous results attained.

As many changes could be made in the above constructions without departing from the scope of the invention, it is intended that all matter contained in the above description or shown in the accompanying drawings shall be interpreted as illustrative and not in a limiting sense.

I claim:

1. A food warmer comprising legs, end, side and bottom walls carried by said legs forming an outer box; an inner box open at its top, an outwardly directed flange on the inner box, said flange resting upon the end and side walls; the inner box being spaced from said side, end and bottom walls; insulation between the container and the side, end and bottom walls; flue portions extending through said insulation and bottoms of said boxes; heating means adjacent said flue portions, and heat deflecting means above said flue portions.

2. A food warmer comprising legs, end, side and bottom walls carried by said legs forming an outer box; an inner box open at its top, an outwardly directed flange on the inner box, said flange resting upon the end and side walls; the inner box being spaced from said side, end and bottom walls; insulation between the container and the side, end and bottom walls; flue portions extending through said insulation and bottoms of said boxes; heating means adjacent said flue portions, heat deflecting means above said flue portion, and a top comprising a frame having a downwardly open concave cross section positioned over the upper edge of the outer box, and removable top sections resting upon said top.

3. A food warmer comprising a heat insulated box having individual covers with openings for receiving vessels for various foods, means dividing said box into individual compartments associated with said individual covers, the box also having individual inlet openings through the bottom in connection with the respective compartments, heating means associated with said last-named openings, said heating means comprising gas burners, individual control means for said heating means, and deflector plates located above said burners within the respective compartments and spaced above said openings and adapted to transmit heat by conduction for radiation from the tops of the plates into the compartments and to deflect convected heat therearound.

MARSH P. DUKE.